United States Patent [19]
Tominaga

[11] Patent Number: 6,067,939
[45] Date of Patent: May 30, 2000

[54] HOUSING FOR A SMALL PET ANIMAL SUCH AS A RODENT OR THE LIKE

[75] Inventor: Kazutoshi Tominaga, Osaka, Japan

[73] Assignee: Kabushiki Kaisha Tominaga Jyushi Kogyosho, Higashiosakashi, Japan

[21] Appl. No.: 09/031,517

[22] Filed: Feb. 27, 1998

[30] Foreign Application Priority Data

Feb. 28, 1997 [JP] Japan ................................. 9-045904

[51] Int. Cl.[7] ................................................. A01K 1/03
[52] U.S. Cl. .......................................... 119/500; 119/474
[58] Field of Search ................................. 119/472, 474, 119/475, 452, 453, 482, 498, 500

[56] References Cited

U.S. PATENT DOCUMENTS 3,195,505  7/1965  Hauth et al. ............................ 119/474
4,917,047  4/1990  Wazeter, III ............................ 119/474
5,134,969  8/1992  Mason et al. ........................... 119/472
5,186,122  2/1993  Phillips et al. .......................... 119/474
5,551,371  9/1996  Markey et al. .......................... 119/482

Primary Examiner—Robert P. Swiatek
Assistant Examiner—Elizabeth Shaw
Attorney, Agent, or Firm—Armstrong, Westerman, Hattori, McLeland & Naughton

[57] ABSTRACT

A housing includes a base tray and an upper cover. Protrusions are provided on at least one opposing surface of an upper end periphery of the base tray and a lower end periphery of the upper cover. When the base tray is connected on the upper cover, ventilating slits are formed between the base tray and the upper cover. Thus, good ventilation is provided in a manner which allows simple manufacturing of the housing.

15 Claims, 10 Drawing Sheets

HOUSING FOR A SMALL PET ANIMAL SUCH AS A RODENT OR THE LIKE

BACKGROUND OF THE INVENTION

1. Field of the Invention

The present invention relates to a housing for a small pet animal such as a rodent, e.g., a hamster or the like.

2. Description of the Related Art

Recently, hamsters have become popular small pet animals especially for city dwellers since hamsters have a nice appearance and a good behavior and are easy to keep even in a relatively small house such as an apartment house, a town house, and the like.

As a housing for hamsters, a cage-type housing having a main cage portion comprising metal wires and a container-type housing made of formed synthetic resin(plastic) have been commonly used.

Among those common housings, a plastic container-type housing can be made into unique shapes with various colors and can be manufactured efficiently at a lower cost by known thermoforming processes. However, the plastic container-type housing is inferior in the ventilation of the housing because of its airtightness. This sometimes causes the inner environment to become excessively high in temperature and high in humidity for hamsters in summer, for example, which may make the environment unpleasant or even dangerous for hamsters.

Therefore, in a conventional plastic container-type housing, ventilating slits are provided on the walls to improve the ventilation thereof.

However, since rodents such as hamsters, or the like, have a gnawing habit, if the gap of the ventilating slit is too wide, hamsters may gnaw peripheral edges of the slits and escape therethrough. On the otherhand, if the gap of the slit is too narrow or the peripheral edge has a circularly shaped cross-section, the edges of the slits can be prevented from being gnawed by hamsters. However, if the gap of the slit is narrow or the peripheral edge of the opening has round-shaped cross-section, the housing is complicated in structure, Accordingly, a structure of a mold for making the housing becomes complicated and the manufacturing cost of the mold will become expensive, which in turn results in an expensive housing.

Under the circumstances, in a conventional plastic molded housing for a hamster, a number of parallel ventilation slits are formed on a ceiling portion of the housing to which hamsters hardly reach. The gap of each slit is formed wide enough to make the structure simple. This can reduce the manufacturing cost and keep the ventilation of the housing adequate to some degree, However, in a conventional plastic housing, since ventilation slits or openings are formed on a ceiling portion, the ventilation of the housing is usually inadequate. Therefore, unexpected changes in temperature and/or humidity in the housing can not be prevented. Thus, this housing still has the above mentioned problems that it may be uncomfortable or dangerous to hamsters.

Though ventilation slits formed on side walls of the housing may result in a good ventilation, the above mentioned:problems will arise, i.e., hamsters may gnaw the peripheral edges of the slits, and/or the structure of the housing becomes complicated, resulting in an increased manufacturing cost.

SUMMARY OF THE INVENTION

The object of the present invention is to provide a housing for small pet animals such as a rodent, or the like, that can be manufactured in a low cost and has sufficient ventilation, and that can effectively prevent hamsters from being uncomfortable due to unexpected changes in temperature and/or humidity in a housing.

In order to achieve the above mentioned objects, the present invention provides a housing which includes a plastic base tray, a plastic upper cover, and protrusions for forming a slit. The base tray includes a bottom wall, a side wall extending upward from a periphery of the bottom wall and an upper end periphery defined by an upper end of the side wall. The upper cover includes a top wall, a side wall extending downward from a periphery of the top wall and a lower end periphery defined by a lower end of the side wall. The upper cover is connected to the base tray with the lower end periphery fitted to the upper end periphery. The protrusions are provided on at least one of opposing surfaces of the lower end periphery and the upper end periphery so as to form a ventilating slit between the base tray and the upper cover.

Since the ventilating silts are formed between the base tray and the upper cover by interposing protrusions between them, the inside of the housing is sufficiently ventilated by the slits.

Since the protrusions are provided on the opposing end periphery of the base tray and/or the upper cover, the structure of a mold for manufacturing the housing will be simplified as compared to the case where, for example, a large number of narrow slits are formed.

In the present invention, it is preferable that the protrusions are spaced apart a predetermined distance between each of them along the opposing end periphery of the base tray and/or the upper cover.

When such a structure is employed, since the ventilating slits are provided along the entire circumference of the end peripheries of the base tray and the upper cover, the inside of the housing can be uniformly ventilated.

It is preferable that each of the opposing end peripheries of the base tray and the upper cover extends outwardly to form a flange along their circumferences and the protrusions are provided on an inner peripheral side of the end periphery of the upper cover and/or lower cover.

When such a structure is employed, the protrusions between the base tray and the upper cover are difficult to be seen from the outside of the housing, and thus a good appearance can be achieved.

It is preferable that the protrusions are made into columnar shape and that corner portions at the inner circumference of the opposing end peripheries of the base tray and the upper cover are rounded.

When such a structure is employed, the protrusions and the opposing end peripheries of the base tray and the upper cover will be prevented from being gnawed and broken by hamsters, or the like. It is further preferable that a hiding wall having a vertical length shorter than a length of the protrusions for forming the slits is provided at along outer circumference of the lower end surface of the end periphery of the upper cover.

When such a structure is employed, since the hiding wall can hide the protrusions, a better appearance can be achieved and the rigidity of the lower end periphery of the upper cover can be improved.

It is preferable that a rib having a length shorter than a length of the protrusions for forming the slits is provided along the inner circumference of the lower surface of the end periphery of the upper cover.

When such a structure is employed, the rigidity of the end periphery of the upper cover can be further improved.

Other objects and features will be apparent from the following detailed description of the invention with reference to the attached drawings.

BRIEF DESCRIPTION OF THE DRAWINGS

The present invention will be more fully described and better understood from the following description of one detailed example, taken with the appended drawings, in which.

DETAILED DESCRIPTION OF THE PREFERRED EMBODIMENTS

Preferred embodiments of the present invention will now be described, in detail, with reference to the accompanying drawings.

Figure 1:
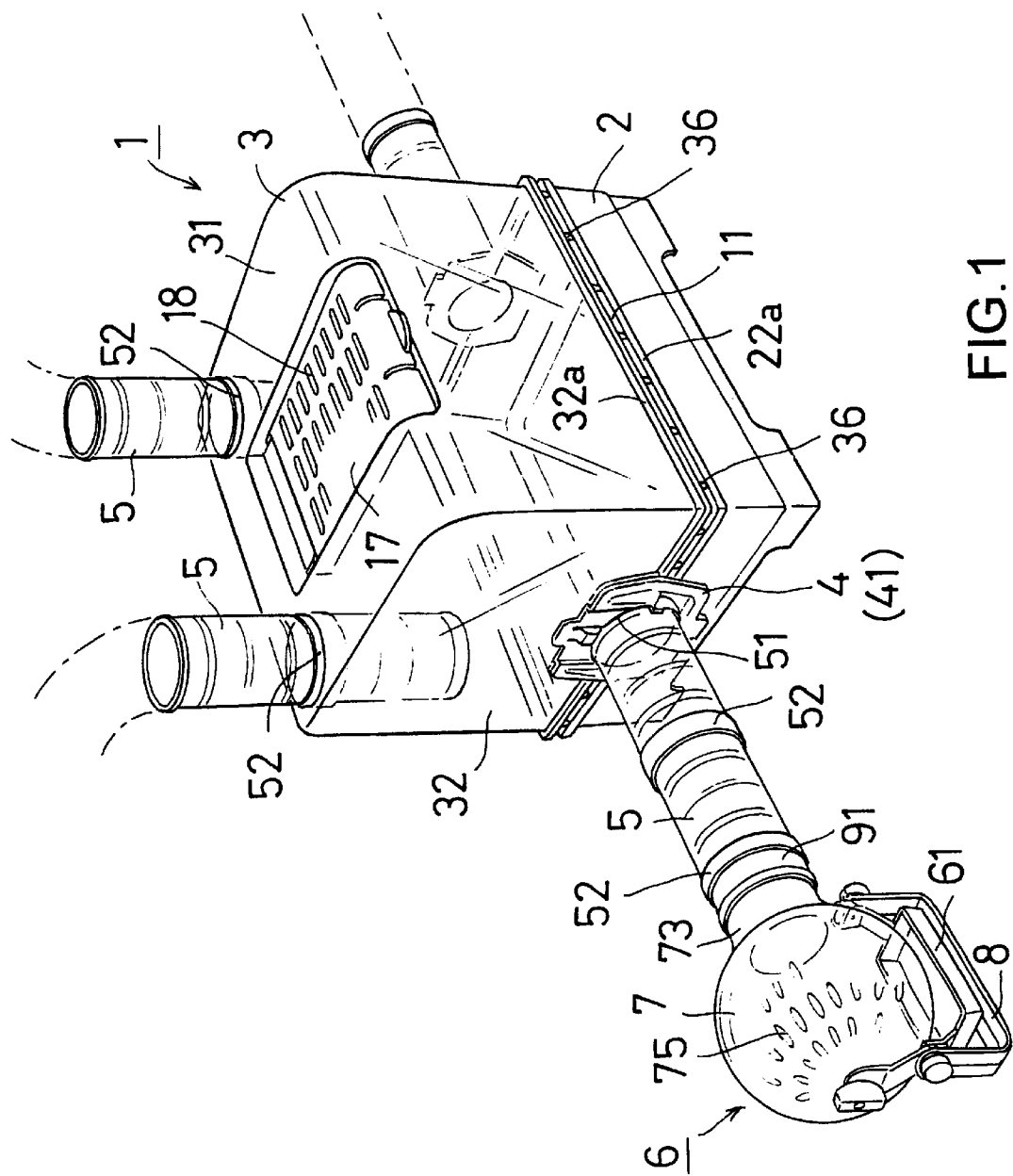
FIG. 1 is a perspective view showing one example of the hamster breeding system of an embodiment according to the present invention.
Figure 2:
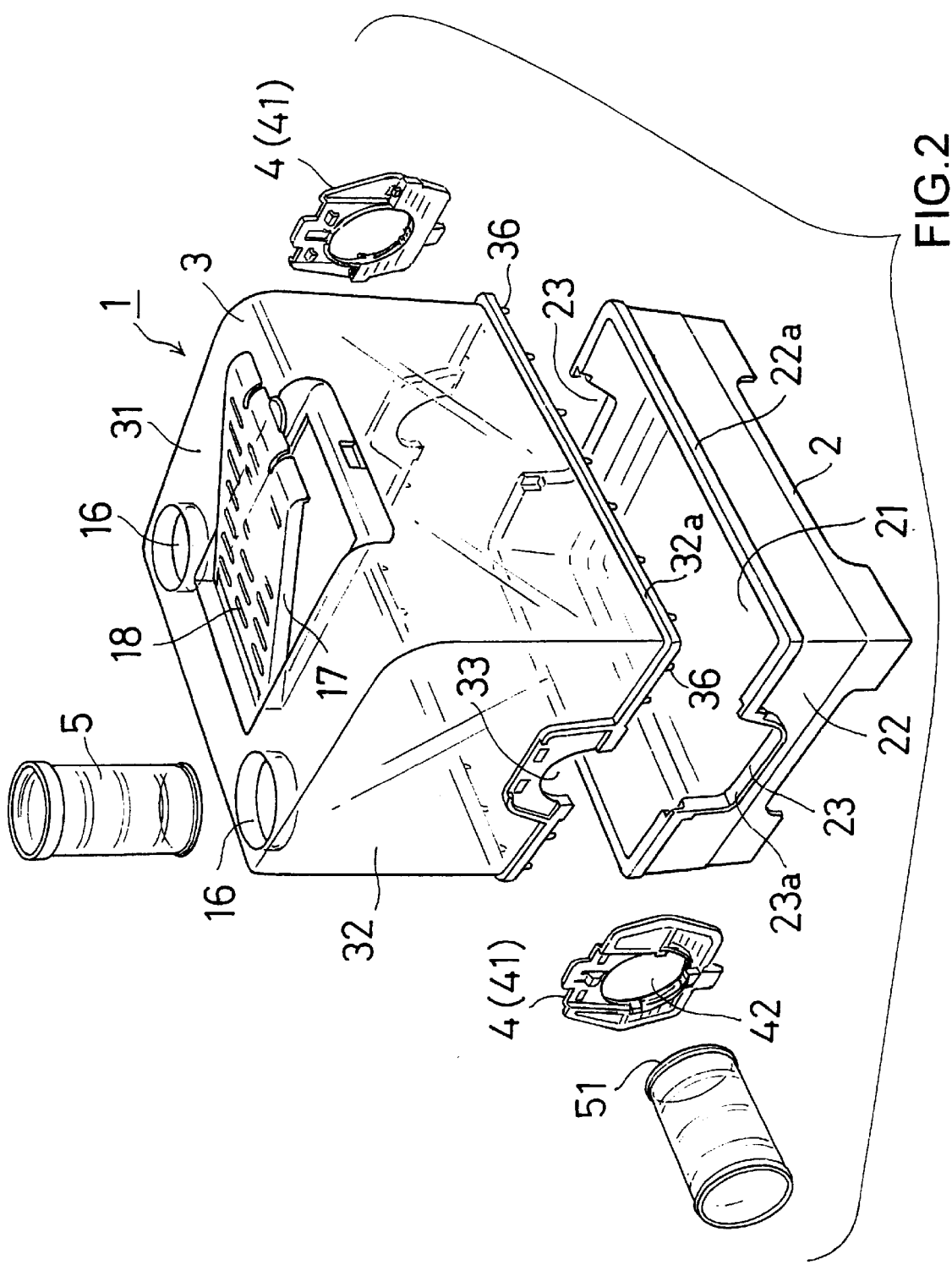
FIG. 2 is a perspective view thereof in a disassembled state.
Figure 3:
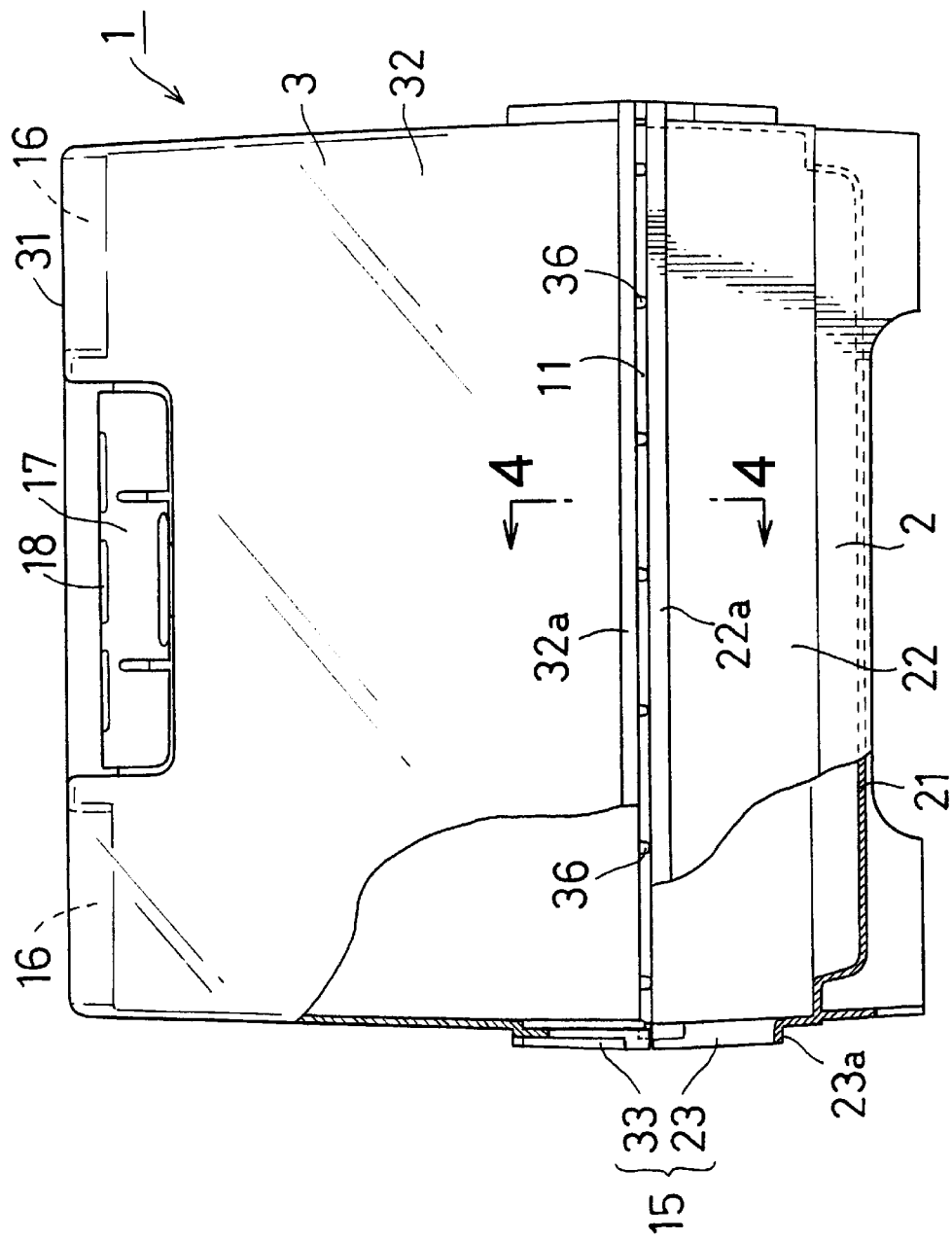
FIG. 3 is a partially cut-out side view of a housing employed in the breeding system of the embodiment.

FIGS. 1 to 3 show an embodiment of a breeding system for hamsters according to the present invention, As shown in these figures, in the breeding system of the present invention, accessories such as a rotary plaything 6 and a passageway tube 5, or the like, can be connected to the breeding housing 1, if desired, so that a desired breeding environment can be formed.

The breeding housing 1 includes a base tray 2, an upper cover 3, and a lip member 4 that connects the upper cover 3 to the base tray 2.

The base tray 2 is a molded hard plastic article of a box shape with its upper end opened. As shown in FIG. 2, the base tray 2 has a bottom wall 21 and side walls 22 extending upward from a periphery of the bottom wall 21 and formed integrally therewith. Among the side walls 22, a U-shaped cut-out portion 23 is provided at a central upper portion of each opposing two side walls 22, respectively.

Figure 4:
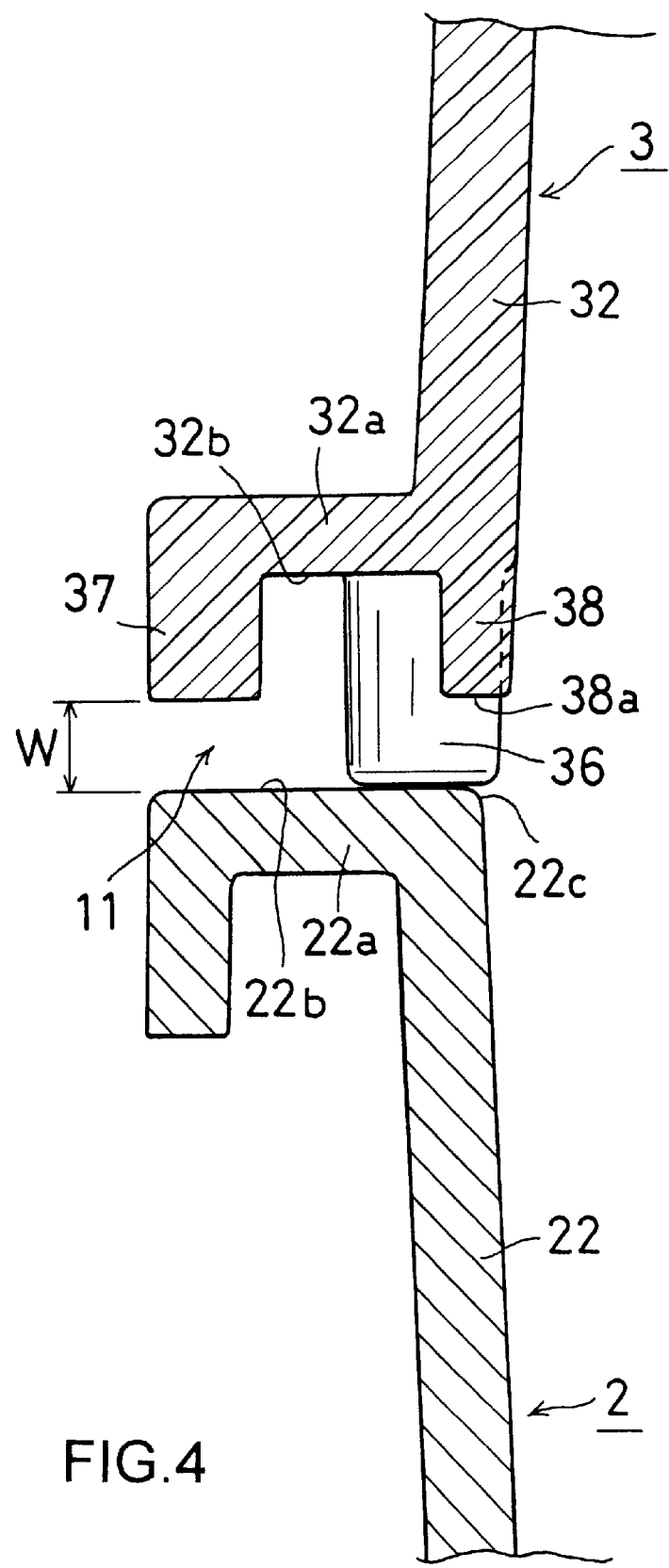
FIG. 4 is an enlarged cross-sectional view taken along the line 4—4 of FIG. 3.
Figure 5:
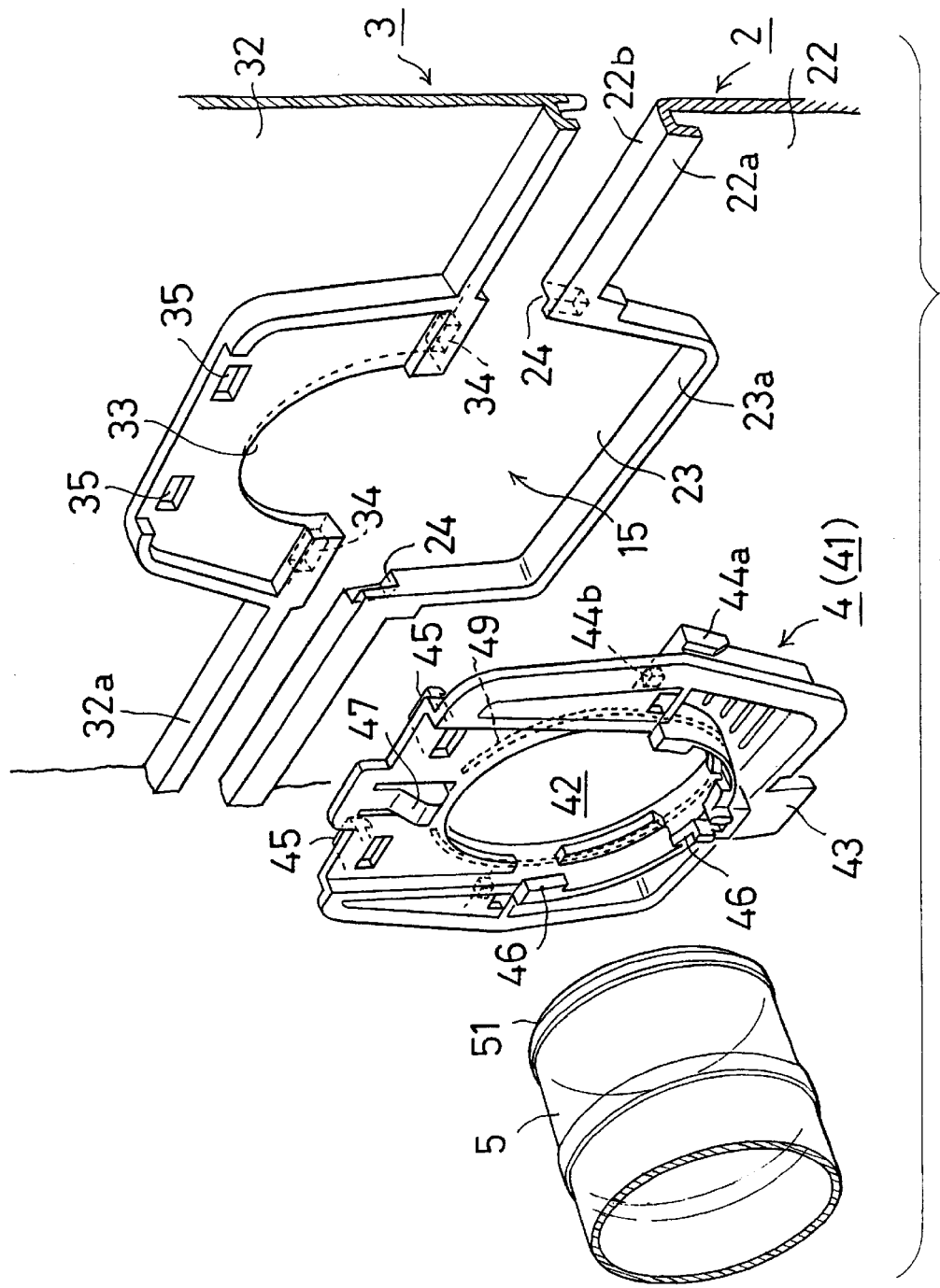
FIG. 5 is a perspective view showing a lip member of the housing of the embodiment in disassembled state.
Figure 6:
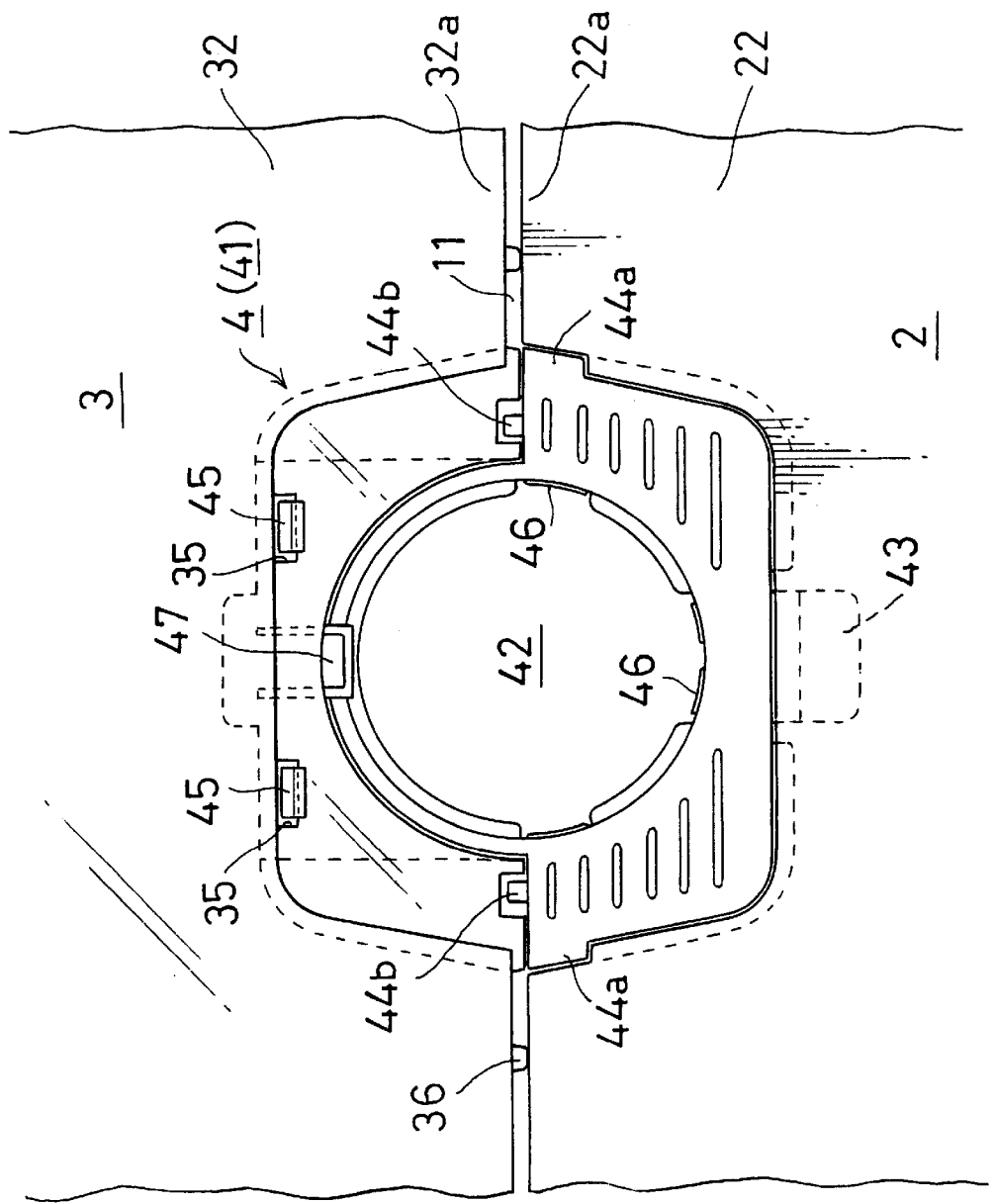
FIG. 6 is an inside view the lip member employed in the housing of the embodiment.
Figure 7:
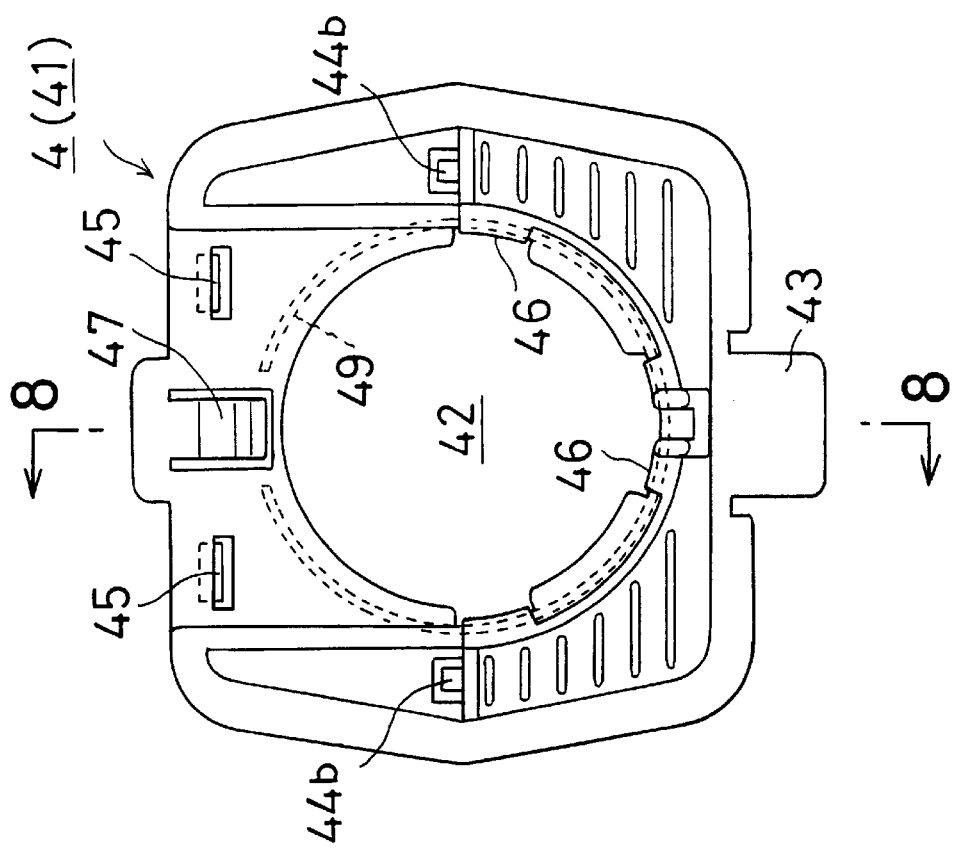
FIG. 7 is an outside view of the lip member employed in the housing of the embodiment.
Figure 8:
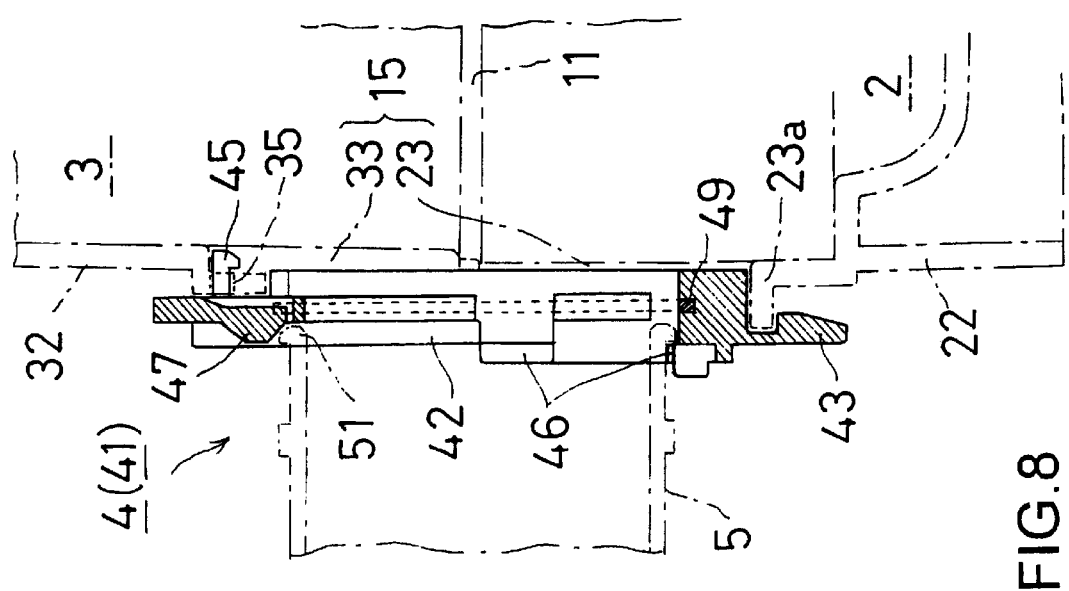
FIG. 8 is a cross-sectional view taken along the line 8–8 of FIG. 7.

As shown in FIGS. 4 and 5, an upper end periphery 22a is defined by an upper end of the side wall 22 of the base tray 2. The upper end periphery 22a and a cut-out periphery 23a of the U-shaped cutout portion 23 protrude outwardly to form a flange. At the insides of corners between the upper end periphery 22a and cutout periphery 23a, recesses 24 for positioning the lip member 4, which will be described below, are provided.

A corner portion 22c between a top surface 22b of the side wall 22 of the base tray 2 and an inner surface of the side wall 22, in other words, a corner portion 22a located at an inner peripheral edge of the upper end periphery 22a, is rounded so that the corner portion 22c is prevented from being gnawed by hamsters.

As shown in FIGS. 1 to 3, the upper cover 3 is a transparent molded hard plastic article of a box-shape with its lower end opened. The upper cover 3 includes a top wall 31 and side walls 32 extending downward from a periphery of the top wall 31 and formed integrally therewith. A lower end periphery 32a is defined by a lower end of the side wall 32 of the upper cover 3. The lower end periphery 32a protrudes outwardly to form a flange. Further, the lower end periphery 32a is formed so as to fit the upper end periphery 22a of the base tray 2. Each of two opposing side walls 32 includes a reversed U-shaped cut-out portion 33, corresponding to the U-shaped cutout 23 of the base tray 2, provided at a central lower portion of each of the opposing two side walls 32.

As best shown in FIG. 4, an inner periphery of a lower end a surface 32b of the side wall 32 has a plurality of protrusions 36 for providing slits along the lower end periphery 32a. The protrusions 36 are of columnar shape so that they are prevented from being gnawed by hamsters.

The lower end surface 32b of the side wall 32 has a protrusion hiding wall 37 that protrudes a lesser amount than the length of the protrusion 36. The hiding wall 37 is formed continuously almost all circumference of the periphery 32a and integrally with the lower end surface 32b. An inner peripheral side of the periphery 32a has a rib 38 that protrudes a lesser amount than the length of the protrusion 36. The rib 38 is formed continuously around almost all of the circumference of the periphery 32a and integrally therewith. A top of the rib 38 is rounded so as to prevent from it being gnawed by hamsters.

As shown in FIGS. 1 to 3, upper entrances 16, 16 that hamster can pass through are formed at both the right and left sides of a rearward portion of the top wall 31 of the upper cover 3. Further, a lid 17 with a plurality of air apertures IS is provided at a center portion of the top wall 31, As shown in FIG. 5, at inside ends of the lower end periphery 32a in the proximity of the reversed U-shape cut-out portion 33, recesses 34 for positioning the lip member 4, which will be described below, are provided. At right and left sides of the upper portion of the reversed U-shaped cut-out portion 33, engaging apertures 35 for engaging the lip member 4 are formed.

The housing 1 having a good appearance with a generally one-box shape, is achieved by covering the upper cover 3 on the base tray 2 so that the opposing lower end periphery 22a and upper end periphery 32a are fitted. The ventilating slits 11 are provided between the opposing lower end periphery 22a of the base tray 2 and the upper end periphery 32a of the upper cover 3 along all the circumference of the housing since the protrusions 36 of the upper cover 3 are abutted to the top surface 22b of the side wall 21 of the base tray 2. Besides, side entrances 15, 15 are formed since the U-shaped cut-out portion 23 of the base tray 2 and the reversed U-shaped cut-out portion 33 of upper cover 3 are disposed across from each other.

As shown in FIG. 4, the height W of the ventilating slits 11 are preferably 1.0 mm–4.0 mm, and more preferably, from 1.5 mm or higher to 3.0 mm or lower. If the height of the slits 11 is too low, it may be impossible to secure a sufficient ventilation within the housing. To the contrary, if the height of the slits 11 is too high, the opposing upper end periphery 22a and the lower end periphery 32a and protrusions existing around the slits 11 may be gnawed and broken by hamsters.

As shown in FIGS. 1 and 2, passageway tube 5 is a transparent or semitransparent hard plastic article that has a flange 51 at outer circumference of both ends. One tube 5 can be connected with another tube 5 through a connecting ring 52 made of soft plastic so that a passageway with a desired length can be obtained.

In the present embodiment, the tube 5 is inserted into each of the upper entrances 16, 16 and connected to the upper cover 3 through connecting ring 52 that is connected to the tube 5 with the outer surface of ring 52 tightly contacting the inner surface of the entrance 16. Alternatively, any of the entrances 16, 16 may be closed by a closing member (not shown)

As shown in FIG. 5 to FIG. 8, the lip member 4, that is disposed at the cut-out portion 23 of the base tray 2 and the cut-out portion 33 of the upper cover 3, comprises a lip body 41 that has a passage 42 at its center portion. The lip body 41 is a molded hard plastic article. Also, a metal ring 49 is mounted along a peripheral portion of passage 42 of the lip body 41 by an insert forming method for preventing hamsters from gnawing.

The lip member 4 has an inner side that faces, the inside of the housing and an outer side that faces the outside of the housing. The lip member 4 has integrally formed upper hooks 45, 45 extending inwardly at both the right and left upper portions of the portions upward the passage 42 at the inner side of the lip member 4. The lip member 4 has a lower hook 43 extending downwardly from its lower end and formed integrally therewith. Both right and left sides of the passage 42 have a protrusion 44a that is formed integrally with the lip member 4 at the inner side of the lip member 4 so that the protrusion 44a corresponds to the recess 24 of the base tray 2. Further, both right and left sides of the passage 42 have a protrusion 44b that is formed integrally with the lip member 4 at the inner side of the lip member 4 so that the protrusion 44b corresponds to the recess 34 of the upper cover 3.

An upper portion of the lip member 4 is attached to the reversed U-shaped cut-out portion 33 of the upper cover 3 in the following manner. The protrusion 44b of the lip member 4 is inserted into the recess 34 of the upper cover 3. Then the top engaging portion of the upper hook 45 of the lip member 4 is engaged with an inner surface of engaging aperture 35 of the upper cover 3. On the other hand, a lower portion of the lip member 4 is attached to the cut-out portion 23 of the base tray 2 in the following manner. The protrusion 44a of the lip member 4 is inserted into the recess 24 of the base tray 2 so that a top engaging portion of the lower hook 43 is engaged with the cut-out portion periphery 23a of the base tray 2.

As described above, the base tray 2 and upper cover 3 are fixed to each other through the lip members 4, 4. By detaching the protrusion 44a from the recess 24 by releasing the engagement of the lower hook 43 of the lip member 4 and base tray 2, the connection between the lip member 4 and the base tray 2 is released. By detaching the protrusion 44b from recess 34 by releasing the engagement of the upper hook 45 of the lip member 4 and the upper cover 3, the connection between the lip member 4 and upper cover 3 is released.

On the outer side of the lip member 4, a flange hook 46 is provided at the lower peripheral portion of passage 42 to engage a lower semicircle portion of the flange 51 of the end of passage tube 5. An elastic protrusion 47 is formed at an upward portion of the passage 42 on the outer side of lip member 4. The lower semicircle of the flange 51 of the passage tube 5 is pushed downward into the flange hook 46 of the lip member 4 to align the axis of the tube 5 with the axis of the passage 42 and so that the tube 5 is connected to the lip member 4 by an elastic engagement between the elastic protrusion 47 and the flange 51 of tube 5. When the connected tube 5 is slid upward, the engagement of the upward portion of the flange 51 by the elastic protrusion 47 is released and the flange 51 will come off from the flange hook 46. Thus, the tube 5 can be detached from the lip member 4.

In the present embodiment, the lower hook 43 comprises an engaging means for the base tray, the upper hook 45 comprises an engaging means for the upper cover, and both the hooks 43 and 45 comprise a fixing means for the body, Further, the flange hook 46 and elastic protrusion 47 comprise a connecting means for tube, In the present embodiment, instead of connecting the tube 5 with the lip member 4 of the base tray 2 and upper cover 3, the passage 42 may be closed by a closing means.

Figure 9:
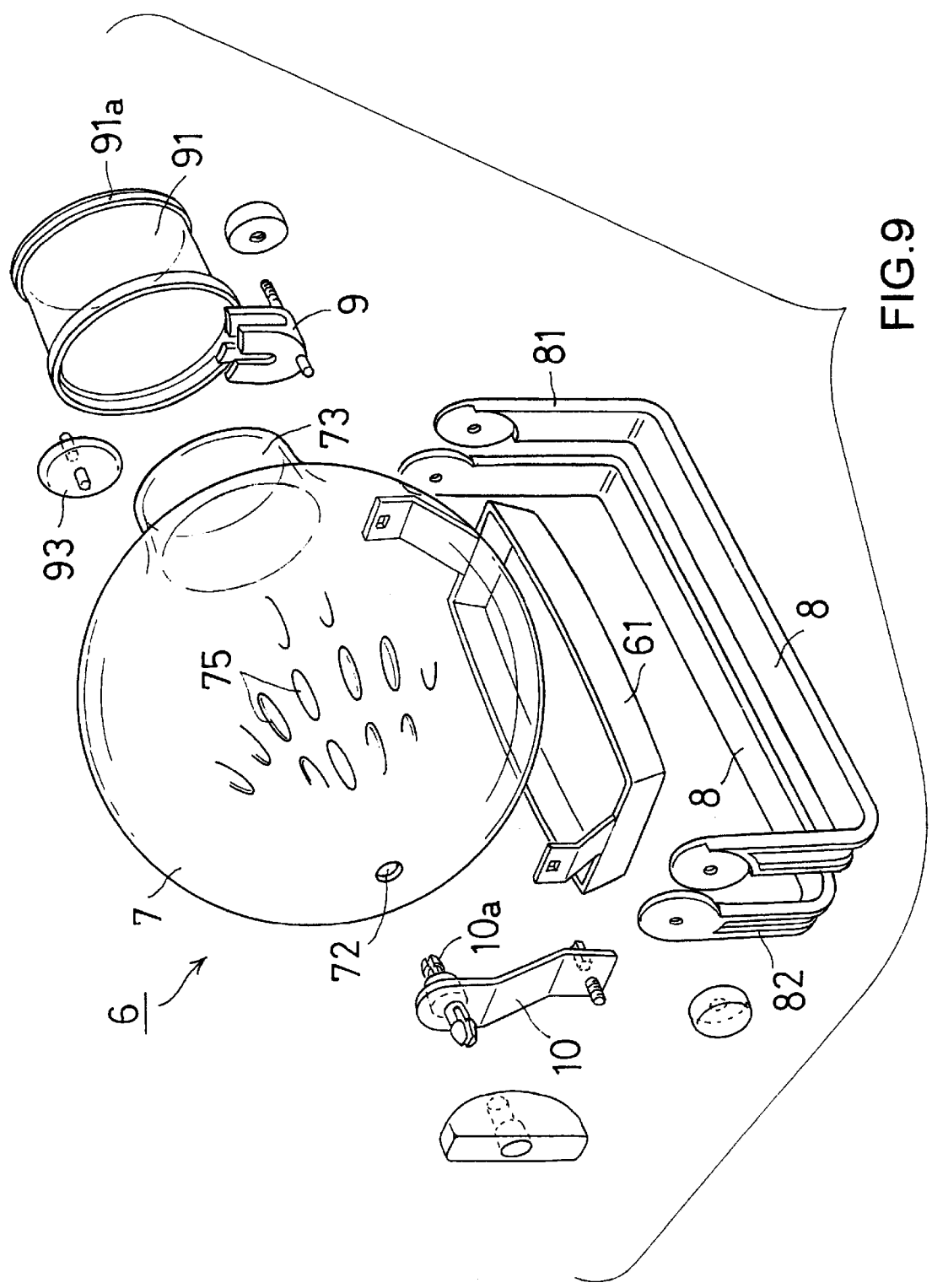
FIG. 9 is a perspective view of a rotary plaything employed in the system of the embodiment in a disassembled separate state.
Figure 10:
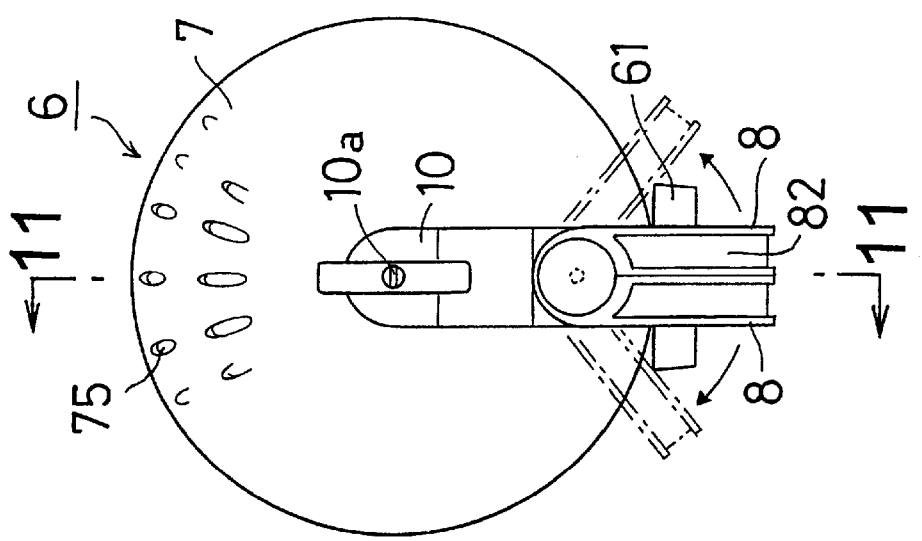
FIG. 10 is a rear view of the rotary plaything of the embodiment.
Figure 11:
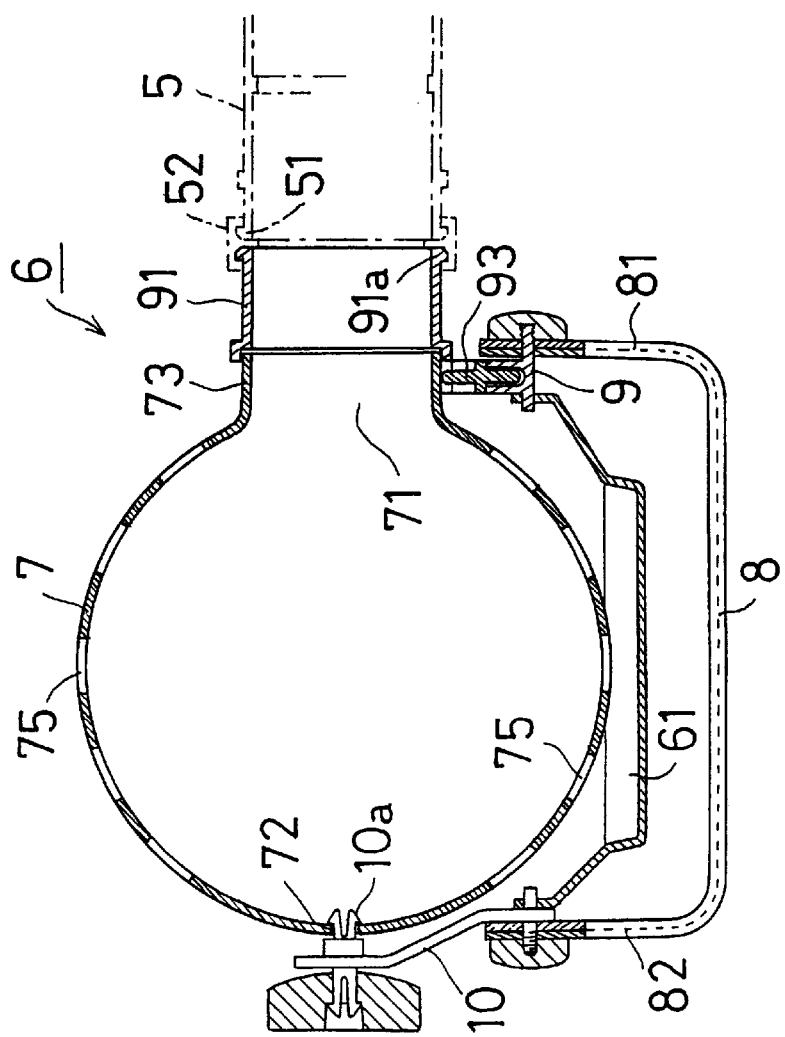
FIG. 11 is a cross-sectional view taken along the line 11—11 of FIG. 10.

As shown in FIGS. 9 to FIG. 11, a rotary plaything 6 has a transparent or semitransparent ball-shaped hollow rotator 7, a pair of legs 8, 8 made of hard plastic and bearing means 9, 10 that rotatably support the hollow rotator 7 to the legs 8, 8.

The hollow rotator 7 has a Circular hole 71 at one end of a predetermined rotating axis so that the central axis of the hole 71 is aligned with the rotating axis. The hollow rotator 7 has a supporting aperture 72 at the other end of rotating axis. A cylindrical roller contact member 73 protrudes outward and is provided on an outer side of the hole 71 of the hollow rotator 7 so that the axis of the roller contact member 73 is aligned with the rotating axis. A number of air holes 75 are provided on the wall of the hollow rotator 7.

Corresponding upper ends of each upright portion 81, 82 of the pair of legs 8, 8 are rotatably attached to each other to allow the legs to be opened and closed. Also, the point where each of the upper end portions of the legs are attached to each other becomes a supporting point. The front bearing member 9 is a molded hard plastic article. The bearing member 9 is fixed to the front upright portion 81 of the leg 8. The backside bearing member 10 is a molded hard plastic article. The bearing member 10 is fixed to the backside upright portion 82, A roller 93 is rotatably attached to the bearing member 9 at a position that corresponds to the outer circumference of the roller contact member 73. A cylindrical passage member 91 is integrally provided with the bearing member 9 so that an axis of the passage member 91 is aligned with the rotating axis of the rotator 7. The circumference of the cylindrical passage member 91 is the same with the circumference of the passage tube 5. The cylindrical passage member 91 has a flange at its one end like that of the tube 5, and therefore may be connected to the tube 5 through the tube connecting ring 52. The cylindrical passage member 91 may be directly connected with the lip member 4. In that case, the legs 8, 8 may be omitted by supporting the bearing members 9, 10 at the housing side.

The roller contact member 73 of one end of the hollow rotator 7 is located so that an end portion of the roller contact member 73 faces the cylindrical passage hole 91. The outer surface of the roller contact member 73 contacts the roller 93 of the front bearing member 9 and accordingly the rotator 7 is rotatably supported. The other end of the hollow rotator 7 is rotatably supported since a bearing axis 10a of the bearing member 10 is inserted in the supporting aperture 72. Therefore, the hollow rotator 7 rotates with both the front side and backside supported by the bearing members 9, 10. At the front side of the hollow rotator 7, the roller 93 rotates and contacts the outer surface of the roller contact member 73 to allow the hollow rotator 7 to rotate.

A litter tray 61 may be provided under the hollow rotator 7 so 10 that the litter tray 61 is supported between the upright portions 81 and 82.

In use, the rotary plaything 6 is usually connected with the breeding housing 1 through passage tube 5. For example, one end of the passage tube 5 is connected with the lip member 4 of the housing 1 as described above, and the other end of the passage tube is connected with the cylindrical passage member 91 as described above.

In the embodiment, hamsters enclosed in the housing 1 will pass through the tube 5 and go into the hollow rotator 7 through the cylindrical member 91 of the rotary plaything 6 to rotate the rotator 7.

As described above, in the hamster breeding system of the present embodiment, since the ventilating slits 11 are provided between the base tray 2 and the upper cover 3 by forming the protrusions 36 on the lower end periphery 32b of the upper cover 3 and by interposing the protrusions 36 between the base tray 2 and upper cover 3, it is possible to keep sufficient ventilation in the housing 1 through the slits 11 and further through the air apertures 18 of the top wall 31.

Additionally, it is a sample structure since the protrusions 36 are provided on the lower end periphery 32b of the upper cover 3, the structure of mold for manufacturing the housing 1 will not be complicated and reduction of cost will be achieved.

Further, since the protrusions 36 are provided in a large number with a predetermined distance between each of them along the lower end periphery 32b of the upper cover 3, an appropriate number of slits 11 are provided along the entire periphery and all circumference of the base tray 2 and the upper cover 3. Therefore, the inside of housing 1 can be evenly ventilated and secure a good air flow.

Since the protrusions 36 are provided at the inner periphery of the lower end periphery 32b, they are difficult to be seen from the outside of the housing 1. Additionally, since the hiding wall 37 is formed at outer circumference of the lower end periphery 32b to hide the protrusions 36, the protrusions 36 are almost invisible from the outside and a good appearance can be achieved.

Since each of the protrusions 36 is a columnar shape, the protrusions 36 are prevented from being gnawed and broken by hamsters. Since the corner portion 22c of the upper end periphery 22a of the base tray 2 and the top portion 38a of the rib 38 formed at the inner peripheral side of the lower periphery 32a are rounded, these portions are also prevented from being gnawed and broken by hamsters.

Since the rigidity of the lower end periphery 32a is strengthen by the hiding wall 37 and rib 38 of the lower end periphery 32a, it is possible to prevent the lower end periphery 32a from being broken when the lower end periphery 32a is bumped with other components during assembly and/or disassembly.

Since a metal ring 49 is inserted at the periphery portion of the passage 42 of the lip member 4 that is to be connected to the housing 1, the periphery portion of the passage 42 is effectively prevented from being gnawed too much by hamsters. Therefore, hamsters are prevented from escaping due to a breakage made from gnawing.

Since the metal ring 49 is fitted by an insert forming method to be hidden within the lip member 4, the ring 49 can be fixed to the lip member 4 more easily and firmly than the case where, for example, the ring is merely attached afterward or the like. Further, since the ring is hidden, a good appearance can be achieved.

Since the lip member 4 is a molded hard plastic article, it is possible to manufacture the lip member more effectively than in the case where the member is made of metal, by a thermal forming method, for example, and the material cost is less expensive, and the production cost can be reduced. Since the lip member 4 is manufactured separately from the housing 1, the structure of the mold for the housing becomes less complicated than the case where a lip member structure is integrally formed with the housing 1, and therefore further reduction of cost can be attained.

In the present embodiment, since the lip member 4 has the members for connecting the base tray 2 and upper cover 3 other than the members for connecting the tube 5, the number of components can be reduced to lower the production cost.

In the rotary plaything 6 of the present embodiment, since the hollow rotator 7 is supported at both the front side and back side on the rotating axis, the rotator 7 can keep a balanced rotation. Further, since the roller contact member 73 is provided with the hollow rotator 7 so that the axis of the roller contact member 73 is aligned with the rotating axis of the rotator 7 and the roller 93 is rotatably attached to the bearing member 9 at a position that corresponds to the outer circumference of the roller contact member 73, the outer surface of the roller contact member 73 directly contacts the roller 93 to rotatably support the rotator 7 so that the rotator can rotate smoothly. Therefore, when the rotator 7 rotates, a load will not concentrate unevenly and the rotator will not wobble, and it is possible to prevent from the rotator 7 being worn at an early stage and to keep a balanced rotation for a long time.

In the present embodiment, since the passage tube 5 is disposed at the hole 71 of the hollow rotator 7, hamsters enclosed in the housing 1 can go to and from the rotary plaything 6. Therefore, the plaything 6 can be locate directly outside the housing without any trouble. Further, since the hole 71 of the hollow rotary 7 has a cylindrical passage member 91 that can be connected to the passage tube 5, the tube 5 can be connected to the rotary plaything 6 easily.

Because the roller contact member 73 is provided with the hollow rotator 7 and the roller 93 is provided with the bearing member 9, the rotary plaything 6 has a simple structure, the production cost is lessened and a less expensive product can be provided.

Since the bearing member 9 and the cylindrical passage member 91 are formed integral with each other in the rotary plaything 6, the number of components can be diminished and the assembling process becomes easy thereby reducing production costs.

Since the litter tray 61 is provided under the hollow rotator 7 in the present rotary plaything 6, excrement of hamsters can be caught by the litter tray 61 to prevent the excrement from scattering.

In the above described embodiment, the rotary plaything 6 has the hole 71 only at one side of the rotating axes.

Figure 12:
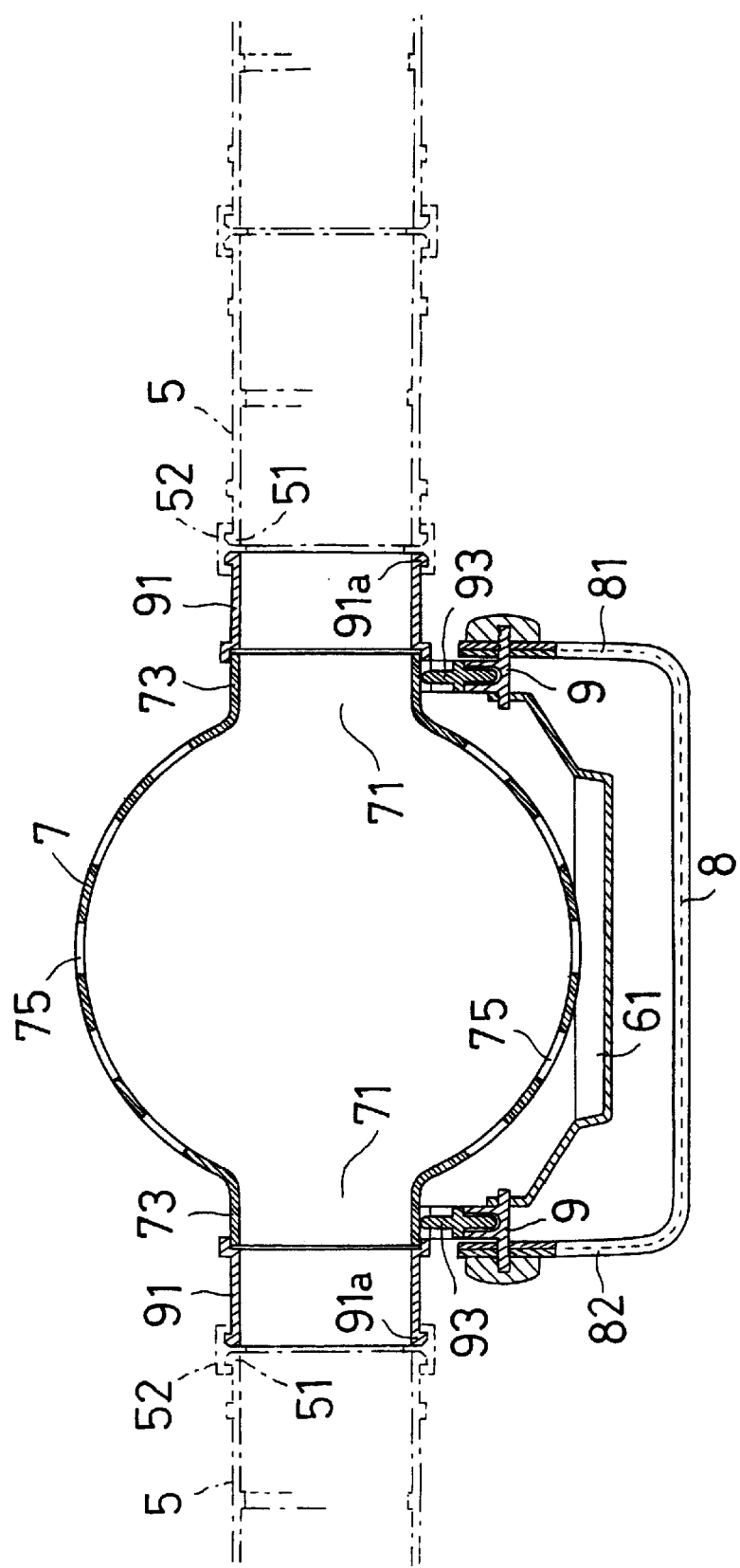
FIG. 12 is a side cross-sectional view of a modified embodiment of the rotary plaything.

However, the present invention is not limited to such an embodiment. As shown in FIG. 12, the holes 71, 71 and roller contact members 73, 73 may be provided on both sides along the rotating axis of the hollow rotator 7 so that both sides are supported by the bearing members 9, 9 having a rollers 93 as described above, and the cylindrical passage members 91, 91 may be provided both sides thereof. In this case, the rotary plaything 6 can be positioned midway in a passageway for hamsters by connecting passage tubes 5, 5 to the holes 71, 71 at both ends of the hollow rotator 7.

In the above described embodiment, the hollow rotator 7 of the rotary plaything 6 has a ball-shape. However, in the present invention the rotator may be made into many shape, for example a drum shape.

In the above described embodiment, the roller 93 is used to rotatably support roller contact member 73. However, the present invention is not limited thereto and a ball such as a hard ball or the like may be used. Further, the number of rollers, like roller 93, is not limited to one.

As described above, according to the housing of the present invention, since protrusions for forming slits are provided on at least one of opposing surfaces of the base tray and the upper cover and the ventilating slits are formed between the base tray and the upper cover by interposing the protrusions therebetween, it is possible to secure a sufficient ventilation within the breeding housing by means of the slits. Therefore, it is possible to minimize undesirable changes in temperature and/or humidity in the housing, allowing observation of the enclosed small animals, such as hamsters or the like, without making uncomfortable. Further, because protrusions are provided with the opposing end periphery of the base tray or upper cover achieving a simple structure, the mold for manufacturing the housing will not be complicated and the production cost can be reduced, In the present invention, a sufficient number of ventilating silts can be formed along the peripheries of the base tray and the upper cover. The protrusions are provided in a large number with a predetermined distance between each of them along the opposing end periphery of the base tray or the upper cover. Therefore, the inside of the housing can be uniformly ventilated.

In the present invention, when the protrusions are provided at inner periphery of the opposing surface of the base tray or the upper cover, it is advantageous that the protrusions are difficult to be seen from the outside of the housing and that a good appearance can be achieved.

In the present invention, when the protrusions are made into columnar shape, or when each of the corner portions at the inner circumference of the opposing end peripheries of the base tray and the upper cover is rounded, these portions will be prevented from being gnawed and broken by hamsters or the like.

In the present invention, when a hiding wall protruding shorter than the length of the protrusions for forming the slits is provided along outer circumference of the lower end surface of the end periphery of the upper cover, the hiding wall can hide the protrusions and thus a good appearance can further be achieved, and additionally, the rigidity of the lower end periphery of the upper cover can be improved to achieve a sufficient durability.

When a rib is provided along the inner circumference of the lower surface of the end periphery of the upper cover, the rigidity of the end periphery of the upper cover can be further improved, and additionally, the durability of the product can further be improved.

Though preferred embodiments according to the present invention have been described, it should be recognized that many modifications are possible which fall within the scope of the present invention. this application claims priority to Japanese Patent Application No, Hei 9(1997)-45904, the disclosure of which is incorporated by reference in its entity.

The terns and expressions which have been employed herein are used as terms of description and not of limitation, and there is no intent, in the use of such terms and expressions, of excluding any of the equivalents of the features shown and described or portions thereof, but it is recognized that various modifications are possible which fall within the scope of the invention claimed.

What is claimed is:

1. A housing for a small pet animal, said housing comprising:

a plastic base tray; and a plastic upper cover, wherein said base tray includes a bottom wall and a side wall extending upward from a periphery of said bottom wall, said side wall having an upper end periphery defined by an upper end of said side wall, wherein said upper cover includes a top wall and a side wall extending downward from a periphery of said top wall, said side wall having a lower end periphery defined by a lower end of said side wall, wherein said upper cover is adapted to be connected to said base tray with said lower end periphery fitted to said upper end periphery, and wherein protrusions are provided on at least one of opposing surfaces of said lower end periphery and said upper end periphery so as to form ventilating slits between said base tray and said upper cover when said upper cover is connected to said base tray, and wherein each of said opposing end peripheries of said base tray and said upper cover includes a flange portion along an outer circumference thereof, and said protrusions are provided at an inner circumference of said at least one of the opposing surfaces of said lower end periphery and said upper end periphery.

2. The housing as defined by claim 1, wherein said protrusions are spaced apart a predetermined distance along said at least one of the opposing surfaces of end peripheries of said base tray and said upper cover.

3. The housing as defined by claim 1, wherein each of said protrusions has a columnar shape.

4. The housing as defined by claim 1, wherein corner portions of an inner circumference of said opposing surfaces of said end peripheries of said base tray and said upper cover are rounded.

5. The housing as defined by claim 1, wherein a height of each of said ventilating slits falls within a range of from 1.0 mm to 4.0 mm.

6. A housing for a small pet animal, the housing comprising:

a plastic base tray includes a bottom wall and a side wall extending upward from a periphery of said bottom wall, said side wall having an upper end periphery defined by an upper end of said side wall; and a plastic upper cover including a top wall and a side wall extending downward from a periphery of said top wall, said side wall having a lower end periphery defined by a lower end of said side wall, wherein said upper cover is adapted to be connected to said base tray with said lower end periphery fitted to said upper end periphery;

protrusions provided on at least one of opposing surfaces of said lower end periphery and said upper end periphery so as to form ventilating slits between said base tray and said upper cover when said upper cover is connected to said base tray; and an L-shaped hiding wall provided along an outer circumference of a lower end surface of said side wall of said upper cover, said L-shaped hiding wall having a first portion extending away from said side wall of said upper cover and a second portion extending away from said first portion towards said base tray and having a length shorter than lengths of said protrusions.

7. The housing as defined by claim 6, wherein said protrusions are spaced apart a predetermined distance along said at least one of the opposing surfaces of end peripheries of said base tray and said upper cover.

8. The housing as defined by claim 6, wherein each of said protrusions has a columnar shape.

9. The housing as defined by claim 6, wherein corner portions of an inner circumference of said opposing surfaces of said end peripheries of said base tray and said upper cover are rounded.

10. The housing as defined by claim 6, wherein a height of each of said ventilating slits falls within a range of from 1.0 mm to 4.0 mm.

11. A housing for a small pet animal, the housing comprising:

a plastic base tray including a bottom wall and a side wall extending upward from a periphery of said bottom wall, said side wall having an upper end periphery defined by an upper end of said side wall; and a plastic upper cover including a top wall and a side wall extending downward from a periphery of said top wall, said side wall having a lower end periphery defined by a lower end of said side wall, wherein said upper cover is adapted to be connected to said base tray with said lower end periphery fitted to said upper end periphery;

protrusions provided on at least one of opposing surfaces of said lower end periphery and said upper end periphery so as to form ventilating slits between said base tray and said upper cover when said upper cover is connected to said base tray; and a rib having a vertical length shorter than lengths of said protrusions, said rib being provided along an inner circumference of a lower end surface of said side wall of said upper cover.

12. The housing as defined by claim 11, wherein said protrusions are spaced apart a predetermined distance along said at least one of the opposing surfaces of end peripheries of said base tray and said upper cover.

13. The housing as defined by claim 11, wherein each of said protrusions has a columnar shape.

14. The housing as defined by claim 11, wherein corner portions of an inner circumference of said opposing surfaces of said end peripheries of said base tray and said upper cover are rounded.

15. The housing as defined by claim 11, wherein a height of each of said ventilating slits falls within a range of from 1.0 mm to 4.0 mm.

* * * * *